Patented Aug. 2, 1949

2,478,015

UNITED STATES PATENT OFFICE 2,478,015

UNSATURATED POLYMERIZABLE LIQUID ESTERS AND PROCESS OF MAKING SAME

John B. Rust and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application October 28, 1944, Serial No. 560,907

9 Claims. (Cl. 260—77)

This invention relates to unsaturated polymerizable liquid esters and to the process for the preparation of the same. More particularly, it relates to the unsaturated esters prepared from polyhydric alcohols and unsaturated monohydric alcohol monoesters of polycarboxylic acids.

It is an object of this invention to prepare an unsaturated, polymerizable liquid ester from a polyhydric alcohol and a monoester of a beta-unsaturated monohydric alcohol and a polycarboxylic acid which is convertible by polymerization catalysts and heat to an insoluble, infusible state.

It is another object to provide an unsaturated nonresinous, polymerizable ester, prepared by the reaction of a polyhydric alcohol with a monoester of a beta-unsaturated monohydric alcohol and a saturated or unsaturated dicarboxylic acid, this ester being convertible by polymerization catalysts and heat to an insoluble-infusible stage.

Another object of this invention is the provision of an unsaturated, non-resinous, polymerizable ester which may be cast into shapes such as rods, plates, sheets, etc., and cured with a peroxide catalyst at a low temperature.

It is a further object of this invention to provide an unsaturated, polymerizable liquid ester which may be cured in the form of thin films as lacquer films, adhesives, etc., by the application of heat, no volatile solvent being required in the application of the film.

It is a still further object to obtain an unsaturated, non-resinous, polymerizable ester which may be cured under pressure in the form of moldings, etc., by the application of heat and pressure.

Also it is an object to provide an unsaturated, nonresinous, polymerizable ester from which laminated products may be formed by curing the said ester by the use of heat and either a low pressure or no pressure, as desired.

A further object of this invention is to furnish a polymerizable ester which may be admixed with styrene, vinyl acetate, methyl methacrylate, ethyl acrylate, acrylonitrile and the like, the said mixture being converted to the insoluble, infusible stage in the form of castings, laminated products, moldings, coatings, adhesives, and the like by the use of peroxides, heat, and pressure as desired.

A still further object of this invention is to provide an unsaturated, non-resinous, polymerizable ester which may be admixed with such resins as urea-formaldehyde, melamine - formaldehyde, phenolics, acetone-formaldehyde, acetone-glyoxal, rosin esters, natural resins, drying oils, drying oil-alkyd resins and the like, the said mixtures being converted by heat to form improved synthetic resins possessing a wide variety of uses such as molding resins, components of nitrocellulose lacquers, varnish resins, baking lacquers, printing inks, castings, moldings, laminated products, adhesives and the like.

Other objects will become apparent from the more detailed description set forth below.

The unsaturated, polymerizable liquid esters of this invention are prepared by heating a polyhydric alcohol and an unsaturated monoester (half ester or "acid ester") of a polycarboxylic acid, preferably under reflux in the presence of a hydrocarbon solvent such as toluol, and at a temperature of 100°–130° C. until all of the water of reaction is azeotropically distilled from the reaction mixture. Finally, the solvent is removed by heating further, the last traces preferably being removed under reduced pressure. A substantially colorless, clear ester is secured which is a more or less viscous liquid possessing a low acid number of 10–40.

An esterification catalyst such as concentrated sulphuric acid, paratoluene sulphonic acid and the like may be used in order to reduce the time of reaction, although this is not necessary. The esterification catalyst may be removed or allowed to remain, as only 0.5% is sufficient to completely esterify the polyhydric alcohol.

Among the polyhydric alcohols suitable for the production of these new esters are pentaerythritol, glycerol, polypentaerythritol, diethylene glycol, trimethylolpropane, sorbitol, mannitol, and the like. Monoesters of beta-unsaturated monohydric alcohols and polycarboxylic acids include the maleic, fumaric, succinic, phthalic, adipic, sebacic, citric, itaconic, citraconic esters of such beta-unsaturated monohydric alcohols as allyl alcohol, methallyl alcohol, crotyl alcohol, chloroallyl alcohol, and the like. The monoesters of unsaturated monohydric alcohols and the polycarboxylic acids or adducts prepared from conjugated diolefines (cyclopentadiene, butadiene, 2-methylpentadiene, isoprene, and the like) and alpha-beta-unsaturated dicarboxylic acids (maleic, fumaric, itaconic, citraconic, and the like, are also suitable. Thus, the polycarboxylic acids include dicarboxylic acids, and particularly saturated or unsaturated alpha-beta dicarboxylic acids.

These esters when poured on a glass plate and baked at 120°–140° C. form hard, tough films which are completely resistant to tap water. Also, they may be converted to hard tough solids at 50°–75° C. by using 0.1–0.5% benzoyl peroxide.

Other peroxides such as tertiary butyl hydroperoxide, ascaridol, and the like, may be employed to bring about this change.

The esters are compatible with urea-formaldehyde, melamine-formaldehyde, phenolic, alkyd resins, drying oil-alkyd resins, natural resins, etc. and may be used advantageously to modify these resins. Also, they are compatible with styrene, vinyl acetate, ethyl acrylate, acrylonitrile, methyl methacrylate, and the like. When such mixtures are copolymerized insoluble resins of widely differing and useful properties are secured.

The following examples are given to illustrate the preparation and properties of the esters of this invention. Parts are by weight.

*Example 1.*—156 parts of monoallyl maleate, 30.7 parts of glycerol, 200 parts of toluol (solvent) and 1.5 parts of paratoluene sulphonic acid were placed in a 3-neck flask equipped with a thermometer, inlet tube for carbon dioxide, and a water trap connected to a water-cooled reflux condenser. Heating was carried out by means of an oil bath. At 115° C.–120° C. esterification was observed to take place and the water of reaction was removed from the reaction mixture by means of the volatile solvent. Heating was continued at this temperature for 4½ hours, there being collected 18 parts of water by azeotropic distillation. Heating was continued at 20–30 mm. pressure for approximately 1–2 hours to remove all of the solvent. A clear, colorless syrup was secured which possessed an acid number of 17.

A film of the ester spread on a glass plate and baked at 140° C. for 1 hour became exceedingly hard and somewhat brittle.

40 parts of the ester and 0.2 part of benzoyl peroxide were mixed together until all of the peroxide was dissolved. The casting solution was placed in a test tube and heated at 50°–60° C. for 48 hours. A hard, brittle casting was obtained.

*Example 2.*—417 parts of monoallyl maleate, 91 parts of pentaerythritol, 250 parts of toluol, and 2.5 parts of paratoluene sulphonic acid were heated together as described in Example 1. During the reaction 48 parts of water were collected. Heating was continued at 20–30 mm. pressure for approximately 1–2 hours to remove all of the toluol solvent. A clear, colorless syrup was secured of acid number 27.

A film of the ester spread on a glass plate and baked at 140° C. for 1 hour became very hard and somewhat brittle.

40 parts of the ester of this example and 0.2 part of benzoyl peroxide were mixed together. The casting solution was baked in a test tube at 50°–60° C. for 48 hours. A hard, brittle casting was obtained.

100 parts of the ester of this example and 0.25 part of benzoyl peroxide were mixed together until all of the peroxide was dissolved. Twelve sheets of glass-fiber cloth were impregnated with the ester containing peroxide, pressed under 0.15 pound per square inch pressure, and baked at 70° C.–80° C. for 6 hours. The resulting laminated cloth was both hard and tough.

*Example 3.*—234 parts of monoallyl maleate, 79 parts of diethylene glycol, 200 parts of toluol, and 2 parts of paratoluene sulphonic acid were heated together as described in Example 1. During the reaction 27 parts of water were collected. Heating was continued at 20–30 mm. pressure for approximately 2 hours to remove all of the toluol solvent. A clear, colorless syrup was secured which possessed an acid number of 22.

40 parts of the ester of this example and 0.2 part of benzoyl peroxide were mixed. The casting solution was baked in a test tube at 50°–60° C. for 48 hours. A hard, brittle casting was secured.

*Example 4.*—218 parts of monoallyl phthalate, 35.1 parts of pentaerythritol, 150 parts of toluol, and 2.5 parts of para toluene sulphonic acid were heated together as described in Example 1, 18.2 parts of water being collected. Heating was continued at 20–30 mm. pressure for 1 to 2 hours to remove all of the toluol solvent. A clear, yellow, viscous syrup was secured, which possessed an acid number of 26.

30 parts of the ester and 0.225 part of benzoyl peroxide were mixed and the solution was heated at 50°–60° C. for 72 hours. A hard, tough, casting resulted.

*Example 5.*—232 parts of monoallyl succinate, 49.9 parts of pentaerythritol, 250 parts of toluol, and 2.0 parts of paratoluene sulphonic acid were heated together as described in Example 1. During the reaction, 25.8 parts of water were collected. Heating was continued at 20–30 mm. pressure for approximately 2 hours to remove all of the volatile constituents. A clear, yellow, viscous liquid was obtained which had an acid number of 34.

30 parts of the ester of this example and 0.225 part of benzoyl peroxide were mixed together until all of the peroxide was dissolved. The casting solution was baked in a test tube at 60°–70° C. for 72 hours. A hard, tough casting was formed.

*Example 6.*—218.4 parts of monoallyl maleate, 63 parts of sorbitol, 200 parts of toluol, and 2.0 parts of paratoluene sulphonic acid were heated together as described in Example 1. During the reaction, 24.7 parts of water were collected. Heating was continued at 20–30 mm. pressure for about 1–2 hours to remove all of the toluol solvent. A clear, yellow, viscous syrup was obtained. Acid number 37.

30 parts of the ester and 0.225 part of benzoyl peroxide were mixed and the solution was baked in a test tube at 60°–70° C. for 72 hours. The cured casting was hard and tough.

*Example 7.*—58.1 parts of trimethylolpropane, 267 parts of a reaction product of monoallyl maleate and cyclopentadiene, 200 parts of toluol, and 2 parts of paratoluene sulphonic acid were heated together as described in Example 1. During the reaction, 22.6 parts of water were collected. Heating was continued at 20–30 mm. pressure for 1–2 hours to remove all of the toluol solvent. A clear, yellow, viscous liquid of acid number 29 was obtained.

30 parts of the ester and 0.20 part of benzoyl peroxide were mixed together until all of the peroxide was dissolved. The casting solution was baked in a test tube at 60°–70° C. for 72 hours. A hard, somewhat rubbery casting resulted.

*Example 8.*—21.2 parts of glycerol, 154 parts of the monoallyl ester of cyclopentadiene maleic adduct, 100 parts of toluol, and 2.0 parts of paratoluene sulphonic acid were heated together as described in Example 1. During the reaction 12.1 parts of water were collected. Heating was continued at 20–30 mm. pressure for from 1 to 2 hours to remove all of the toluol solvent. A clear, yellow syrup was obtained which possessed an acid number of 21.

40 parts of the ester and 0.2 part of benzoyl peroxide were mixed together until all of the peroxide was dissolved. The casting solution was baked at 60°–70° C. for 72 hours. This formed a hard, tough casting.

The examples previously outlined have been given in the way of illustration only and cannot be considered as limiting. These examples show specific monoesters and polyhydric alcohols in which examples with pentaerythritol, the mole ratio of pentaerythritol to half ester in those examples is 1:4. However, to those skilled in the art it will be apparent that a number of monoesters will readily lend themselves to the formulation of these esters. For example, the monoallyl maleate of Examples 1 and 2 may be replaced in part by such monoesters as monoallyl phthalate or monoethyl maleate. Thus, by careful selection of polyhydric alcohol and dicarboxylic acid-monoester, a wide variety of unsaturated, non-resinous, polymerizable esters may be prepared for any specific use.

As has been mentioned heretofore, these esters are compatible with, and may be copolymerized with a number of unsaturated products such as styrene, vinyl acetate, methyl methacrylate and the like. The following example is given by way of illustration.

Example 9.—36 parts of the ester of Example 2, 4 parts of methyl methacrylate and 0.15 part of benzoyl peroxide were mixed together and poured into a mold. The syrup set up at 20° C. after standing for 15 hours to a soft gel. The casting was then baked at 45°–50° C. for 24 hours. A hard, brittle casting was secured which could readily be machined.

We claim:

1. An unsaturated liquid ester capable of curing under heat comprising the reaction product of pentaerythritol with a beta-unsaturated monohydric alcohol monoester of a dicarboxylic acid in the mole ratio of 1:4.

2. The process of making an unsaturated liquid ester which is capable of curing under heat, comprising reacting by heating together pentaerythritol and a beta-unsaturated monohydric alcohol monoester of a dicarboxylic acid in the mole ratio of 1:4.

3. An unsaturated liquid ester capable of curing under heat comprising the reaction product of pentaerythritol with monoallyl maleate in the mole ratio of 1:4.

4. The process of making an unsaturated liquid ester which is capable of curing under heat, comprising reacting by heating together pentaerythritol and monoallyl maleate in the mole ratio of 1:4.

5. An unsaturated liquid ester capable of curing under heat comprising the reaction product of pentaerythritol with monoallyl phthalate in the mole ratio of 1:4.

6. An unsaturated liquid ester capable of curing under heat comprising the reaction product of pentaerythritol with a monoallyl ester of a dicarboxylic acid in the mole ratio of 1:4.

7. A product comprising the heat-cured ester of claim 1.

8. The process of making an unsaturated liquid ester which is capable of curing under heat, comprising reacting by heating together pentaerythritol and monoallyl phthalate in the mole ratio of 1:4.

9. The process of making an unsaturated liquid ester which is capable of curing under heat, comprising reacting by heating together pentaerythritol and a monoallyl ester of a dicarboxylic acid in the mole ratio of 1:4.

JOHN B. RUST.
WILLIAM B. CANFIELD.

REFERENCES CITED

The following references are of record in the file of this patent:

UNITED STATES PATENTS

| Number | Name | Date |
|---|---|---|
| 1,921,756 | Kienle | Aug. 8, 1933 |
| 2,280,242 | Kropa et al. | Apr. 21, 1942 |
| 2,370,565 | Muskat et al. | Feb. 27, 1945 |